(No Model.)
E. T. GREENFIELD.
METHOD OF MAKING BINDING POSTS.
No. 454,430. Patented June 16, 1891.
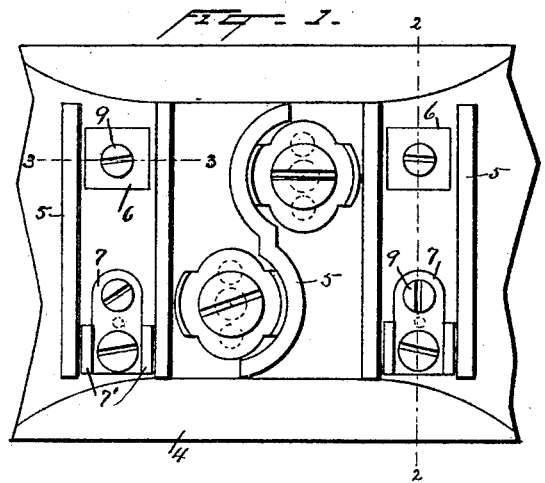
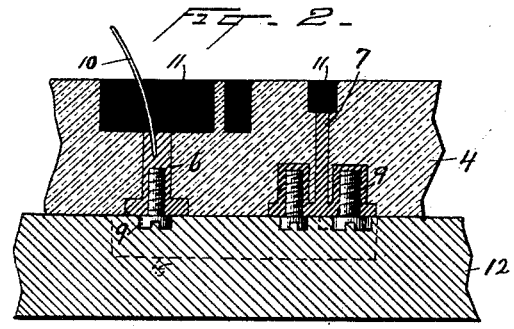
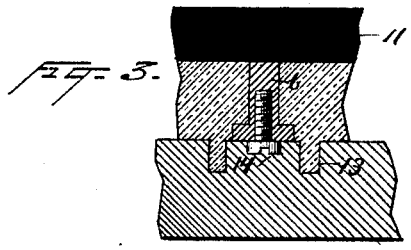
Witnesses
Norris A. Clark.
N. F. Oberly
Inventor
E. T. Greenfield.
By his Attorneys
Dyer & Seely.

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

METHOD OF MAKING BINDING-POSTS.

SPECIFICATION forming part of Letters Patent No. 454,430, dated June 16, 1891.

Application filed December 16, 1890. Serial No. 374,857. (No model.)

*To all whom it may concern:*

Be it known that I, EDWIN T. GREENFIELD, a citizen of the United States, residing at New York city, county and State of New York, have invented a certain new and useful Improvement in Methods of Making Connecting and Supporting Blocks and Terminals Therefor, of which the following is a specification.

The invention relates to the method of forming terminals or binding-posts and securing them in position in the insulating-blocks in which they are to be used.

The object of the invention is to increase the facility of manufacture of said devices, to lessen the cost of the devices, and at the same time to furnish a simpler construction than has heretofore been used.

In the accompanying drawings, which illustrate my improvements, Figure 1 is a plan view of a portion of a block with the binding-posts in place therein. Fig. 2 is a section on line 2 2 of Fig. 1, the block being inverted and placed face downward on a mold. Fig. 3 is a similar section on line 3 3 of Fig. 1.

The block or plate 4, already referred to, may be made of any suitable insulating material, preferably of some material which can be cast or molded into the proper form—for example, earthenware. The block illustrated is provided with several ribs or flanges 5 across its face for the purpose of separating the circuit-terminals by an insulated screen, as is well known in the art. The binding-posts 6 7, carried by the block, which may be of any desired shape and of which there may be any desired number, are placed between the several flanges, as shown. Post 6 is shown provided with a single screw and post 7 with two screws. 7 also has two metallic extensions 7'. When an external wire is to be connected to this binding-post, it is placed under the head of the lower screw between one of the extensions 7' and the shank of the screw and the screw then tightened, as will be evident.

9 are the binding-screws co-operating with the posts in the ordinary manner.

In Fig. 2, 10 is the end of a wire metallically connected with a binding-post in the manner hereinafter described.

In forming the blocks 4 holes are provided for the reception of the binding-posts or terminals, and in the bottom of the block grooves 11 are formed. Said holes or recesses conform in shape and in position to the terminals to be supported by the block.

12 is a mold of metal or other suitable material, the face of which is formed to correspond in shape with the face of the block above described, there being a groove 13 for each of the insulating-flanges 5 and corresponding depressions for other raised portions on the face of the block.

Depressions 14 are provided in the mold for the reception of the heads of screws for the binding-posts.

The method of forming the posts will now be described. Screws are first placed on the mold in the position indicated in Figs. 2 and 3. The block 4 is then inverted over the screws and rests on the face of the mold, as indicated in Figs. 2 and 3. If it is desired to permanently connect electrical wires with the binding-posts for any purpose, such wires are inserted into the holes in the block, as shown at 10. Molten lead or other suitable metal is poured into said holes around the screws and around the wires, thus forming the posts. After the metal has set or partially set the block 4 is raised and the screws 9 are turned out. This may be done when the post is to be used, the screws being turned out at least far enough to admit a wire under the heads. By this method the wires and binding-posts are firmly connected, the posts are securely attached and held in the block, and the screw-threaded socket for the binding-screw is made. The posts are permanently embedded or formed in a block in the apertures, as distinguished from constructions in which posts are made and then temporarily or removably placed in a supporting-plate. It will be evident that the several posts or terminals may be connected in the grooves 11 in any desired order. Said grooves may then be filled with insulating material.

Heretofore in making connecting devices of this character the block has been formed, metal posts have been made, screw-holes have been drilled therein, and the posts have been inserted into the holes provided for them and secured by nuts. Connecting-wires have then been soldered to the posts. The several parts constituting the device and the labor required in putting the parts together were more expensive than in my new device and method, as will appear from the description before given. In some cases I may cast the posts directly in the holes in the block in which they are to remain as permanent fixtures without placing the screws on the mold. The screw-hole may then be made in any suitable manner. After forming the posts, as describd, I prefer to copper-plate the exposed ends.

Although the binding-posts are made of a metal which is a comparatively poor conductor, I have found that in practice, when made as above described, they have a carrying capacity sufficient for the current which is used in the system for which they are designed.

Having thus described the invention, what I claim is—

1. The method of making connecting and supporting blocks for electrical purposes, consisting in forming a block of insulating material with recesses conforming in shape and position to the terminals to be supported by said block, and then filling said recesses with melted metal and allowing the same to harden and to remain therein, substantially as described.

2. The method of making connecting and supporting blocks for electrical purposes, consisting in forming a block of insulating material with recesses conforming in shape and position to the terminals to be supported by said block, placing screws in said recesses, filling the recesses around the screws with melted metal and allowing the same to harden and to remain in the recesses, and then turning the screws to loosen them and to form screw-threaded cavities, substantially as described.

3. The method of making connecting and supporting blocks for electrical purposes, consisting in forming a block of insulating material with recesses conforming in shape and position to the terminals to be supported by said block, placing screws and wire terminals in said recesses, and filling the recesses around the screws and wires with melted metal and allowing the same to harden and to remain in the recesses, substantially as described.

4. The method of making connecting and supporting blocks for electrical purposes, consisting in forming a block of insulating material with recesses conforming in shape and position to the terminals to be supported by said block, forming a mold adapted to receive the face of said block and with depressions, placing a screw with its head in each depression, inverting the block over said mold and screws, and filling the recesses around the screws with melted metal and retaining the same in the block, substantially as described.

This specification signed and witnessed this 13th day of December, 1890.

EDWIN T. GREENFIELD.

Witnesses:
D. H. DRISCOLL,
CHARLES M. CATLIN.